United States Patent
Zheng et al.

(10) Patent No.: US 10,592,783 B2
(45) Date of Patent: Mar. 17, 2020

(54) RISKY TRANSACTION IDENTIFICATION METHOD AND APPARATUS

(71) Applicant: Alibaba Group Holding Limited, George Town (KY)

(72) Inventors: Wenhao Zheng, Hangzhou (CN); Yalin Zhang, Hangzhou (CN); Longfei Li, Hanzghou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/366,794

(22) Filed: Mar. 27, 2019

(65) Prior Publication Data

US 2019/0303728 A1    Oct. 3, 2019

(30) Foreign Application Priority Data

Mar. 27, 2018  (CN) .......................... 2018 1 0258226

(51) Int. Cl.
  *G06K 9/62* (2006.01)
  *G06Q 20/40* (2012.01)
  *G06N 20/00* (2019.01)

(52) U.S. Cl.
  CPC ......... *G06K 9/6277* (2013.01); *G06K 9/6256* (2013.01); *G06N 20/00* (2019.01); *G06Q 20/4016* (2013.01)

(58) Field of Classification Search
  CPC .... G06K 9/6277; G06K 9/6256; G06N 20/00; G06Q 20/4016
  See application file for complete search history.

(56) References Cited

U.S. PATENT DOCUMENTS

| | | |
|---|---|---|
| 5,822,741 A | 10/1998 | Fischthal |
| 6,330,546 B1 | 12/2001 | Gopinathan et al. |
| 7,089,592 B2 | 8/2006 | Adjaoute |
| 7,376,618 B1 | 5/2008 | Anderson et al. |
| 8,019,678 B2 | 9/2011 | Wright et al. |

(Continued)

FOREIGN PATENT DOCUMENTS

| | | |
|---|---|---|
| TW | I484421 | 5/2015 |
| TW | 201546640 | 12/2015 |

OTHER PUBLICATIONS

Anis et al, A Comparative Study of Decision Tree Algorithms for Class Imbalanced Learning in Credit Card Fraud Detection, 2015, International Journal of Economics, Commerce and Management (Year: 2015).*

(Continued)

*Primary Examiner* — Austin Hicks
(74) *Attorney, Agent, or Firm* — Fish & Richardson P.C.

(57) ABSTRACT

A feature extraction is performed on transaction data to obtain a user classification feature and a transaction classification feature. A first dimension feature is constructed based on the user classification feature and the transaction classification feature. A dimension reduction processing is performed on the first dimension feature to obtain a second dimension feature. A probability that the transaction data relates to a risky transaction is determined based on a decision classification of the second dimension feature, where the decision classification is based on a pre-trained deep forest network including a plurality of levels of decision tree forest sets.

17 Claims, 9 Drawing Sheets

(56) References Cited

U.S. PATENT DOCUMENTS

| | | |
|---|---|---|
| 2015/0039512 A1 | 2/2015 | Adjaoute |
| 2015/0254555 A1 | 9/2015 | Williams, Jr. et al. |
| 2017/0262852 A1 | 9/2017 | Florimond et al. |
| 2019/0188615 A1* | 6/2019 | Liu .................... G06Q 10/0635 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/US2019/024242, dated Jul. 18, 2019, 13 pages.

Zhou et al., "Deep Forest: Towards An Alternative To Deep Neural Networks," Proceedings of the Twenty-sixth International Joint Conference on Artificial Intelligence, Aug. 2017, p. 3553-3559.

PCT Written Opinion of the International Preliminary Examining Authority in International Application No. PCT/US2019/024242, dated Jan. 29, 2020, 6 pages.

\* cited by examiner

RISKY TRANSACTION IDENTIFICATION METHOD AND APPARATUS

CROSS-REFERENCE TO RELATED APPLICATIONS

This application claims priority to Chinese Patent Application No. 201810258226.X, filed on Mar. 27, 2018, which is hereby incorporated by reference in its entirety.

TECHNICAL FIELD

Implementations of the present specification relate to the field of Internet technologies, and in particular, to a risky transaction identification method and apparatus, a server, and a storage medium.

BACKGROUND

With the rapid development of the Internet, various forms of services such as online banking, online payment, and online shopping continuously emerge. People have become increasingly accustomed to performing various life or business activities on the Internet.

Since the Internet is an open network, anyone can easily connect to the Internet anywhere. The Internet brings convenience to people's life, but also causes risks to people's life. Especially, with the development of the e-commerce platform and the third-party transaction platform, network finance crime, online fraud, unauthorized charge of a credit card, etc. continuously occur. Therefore, it is more and more important to identify risky transactions.

SUMMARY

Implementations of the present specification provide a risky transaction identification method and apparatus, a server, and a storage medium.

According to a first aspect, an implementation of the present specification provides a risky transaction identification method, including: performing feature extraction on transaction data that is to be identified, to obtain a user classification feature and a transaction classification feature; constructing a first dimension feature based on the user classification feature and the transaction classification feature, and performing dimension reduction processing on the first dimension feature to obtain a second dimension feature; inputting the second dimension feature into a pre-trained deep forest network, where the deep forest network includes multiple levels of decision tree forest sets, and each level of decision tree forest set includes multiple base classifiers; and performing decision classification on multiple dimensions of features based on the depth forest network, to obtain a probability that the transaction data that is to be identified relates to a risky transaction.

According to a second aspect, an implementation of the present specification provides a method for training a depth forest network for risky transaction identification, including: collecting risky transaction-related black samples and white samples, and performing feature extraction on data of the black samples and the white samples to obtain a user classification feature and a transaction classification feature; constructing a first dimension feature based on the user classification feature and the transaction classification feature, and performing dimension reduction processing on the first dimension feature to obtain a second dimension feature; training base classifiers in a first-level decision tree forest set based on the second dimension feature, concatenating an output feature of a current-level decision tree forest set with the second dimension feature, and training base classifiers in a next-level decision tree forest set by using a concatenated feature, where whether a predetermined end condition is satisfied is determined after each level of decision tree forest set is trained, and a next-level decision tree forest set is trained only if the predetermined end condition is not satisfied; and ending training when the predetermined end condition is satisfied, to obtain the deep forest network including multiple levels of decision tree forest sets.

According to a third aspect, an implementation of the present specification provides a risky transaction identification apparatus, including: a feature extraction and processing unit, configured to perform feature extraction on transaction data that is to be identified, to obtain a user classification feature and a transaction classification feature; and construct a first dimension feature based on the user classification feature and the transaction classification feature, and perform dimension reduction processing on the first dimension feature to obtain a second dimension feature; and a prediction unit, configured to input the second dimension feature into a pre-trained deep forest network, where the deep forest network includes multiple levels of decision tree forest sets, and each level of decision tree forest set includes multiple base classifiers; and perform decision classification on multiple dimensions of features based on the depth forest network, to obtain a probability that the transaction data that is to be identified relates to a risky transaction.

According to a fourth aspect, an implementation of the present specification provides an apparatus for training a depth forest network for risky transaction identification, including: a sample acquisition unit, configured to collect risky transaction-related black samples and white samples; a feature extraction and processing unit, configured to perform feature extraction on data of the black samples and the white samples to obtain a user classification feature and a transaction classification feature; and construct a first dimension feature based on the user classification feature and the transaction classification feature, and perform dimension reduction processing on the first dimension feature to obtain a second dimension feature; a training execution unit, configured to train base classifiers in a first-level decision tree forest set based on the second dimension feature, concatenate an output feature of a current-level decision tree forest set with the second dimension feature, and train base classifiers in a next-level decision tree forest set by using a concatenated feature, where whether a predetermined end condition is satisfied is determined after each level of decision tree forest set is trained, and a next-level decision tree forest set is trained only if the predetermined end condition is not satisfied; and a network determining unit, configured to end training when the predetermined end condition is satisfied, to obtain the deep forest network including multiple levels of decision tree forest sets.

According to a fifth aspect, an implementation of the present specification provides a server, including a memory, a processor, and a computer program that is stored in the memory and that can run on the processor, where the processor implements the steps of the method according to any one of the previously described aspects when executing the program.

According to a sixth aspect, an implementation of the present specification provides a computer readable storage medium, where a computer program is stored in the computer readable storage medium, and the steps of the method according to any one of the previously described aspects are implemented when the program is executed by a processor.

The implementations of the present specification have the following beneficial effects:

In the risky transaction identification method provided in the implementations of the present invention, dimension reduction processing is performed on features of transaction data, and decision classification is performed on dimension-reduced features by using multiple base classifiers in each level of decision tree forest set in a depth forest network, to finally determine a risky transaction probability. Particularly, a sampling frequency can be determined based on a feature classification, and different sampling methods are used for different classifications of features, so that overfitting can be alleviated or feature attributes can be retained as more as possible. In addition, for a case in which samples of an illegal transaction may be particularly sparse, sampling can be separately performed for black samples and white samples, and a k-fold cross validation method can be used, to ensure that a number of positive samples and a number of negative samples in each fold are consistent or approximately consistent. Further, a decision tree depth of the base classifier can be set to be not greater than a maximum depth threshold, to alleviate a problem that a sample of a normal transaction is erroneously identified because a number of black samples and a number of white samples are greatly different.

DESCRIPTION OF IMPLEMENTATIONS

To better understand the previously described technical solutions, the following describes in detail the technical solutions in the implementations of the present specification by using the accompanying drawings and specific implementations. It is worthwhile to understand that the implementations of the present specification and the specific features in the implementations are detailed descriptions of the technical solutions in the implementations of the present specification, and are not intended to limit the technical solutions of the present specification. In case of no conflict, the implementations of the present specification and the technical features in the implementations can be mutually combined.

Figure 1:
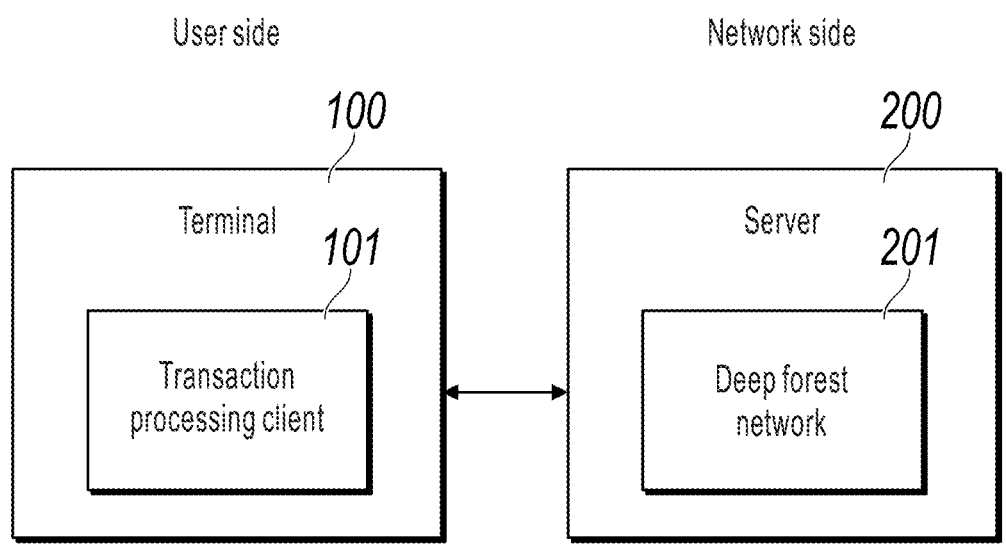
FIG. 1 is a schematic diagram illustrating a risky transaction identification scenario, according to an implementation of the present specification.

FIG. 1 is a schematic diagram illustrating a risky transaction (an abnormal transaction or an illegal transaction) identification scenario, according to an implementation of the present specification. A terminal 100 is located on a user side and communicates with a server 200 on a network side. A transaction processing client 101 in the terminal 100 can be an APP or a website that implements a service based on the Internet, and provides a transaction interface for a user and provides transaction data for a network side for processing. The server 200 uses a pre-trained depth forest network 201 to identify a risky transaction that the transaction processing client 101 is involved in.

With emergence of artificial intelligence, as the most important technology in artificial intelligence, machine learning increasingly attracts attention of people. The machine learning algorithm has the advantage of being more flexible and intelligent. Nowadays, the gradient boosting decision tree is used in most machine learning solutions that are based on multiple classifications of features (a discreteness feature, a continuity feature, and a classification attribute feature). However, although this structure can adapt to multiple scenarios, it has some limitations. For example, in a scenario with relatively few black samples, there are still deficiencies in how to identify more black users, how to improve prediction accuracy, etc.

In a risk control scenario, a transaction with a security risk usually needs to be identified. Such transaction is referred to as an illegal transaction. A number of such transactions is far less than a number of normal transactions, and a ratio of the number of such transactions to the number of normal transactions is usually one to several hundred or several thousand. In addition, abnormal transactions differ from each other in various aspects. Therefore, it is relatively difficult to dig for an illegal transaction. In view of this, the implementations of the present invention provide a method for training a deep forest network for risky transaction identification and a risky transaction identification method, applied to the intelligent risk control field, so that more illegal transactions can be identified than previous algorithms through feature dimension reduction, sample sampling, decision tree depth limitation, etc.

The deep forest network is a multi-layer (multi-level) network that is constructed based on the idea of ensemble learning by using a decision tree-based set (forest) as a base classifier, and a number of network layers can be adaptively obtained. A node of each layer of the network is a gradient boosting decision tree.

Figure 2:
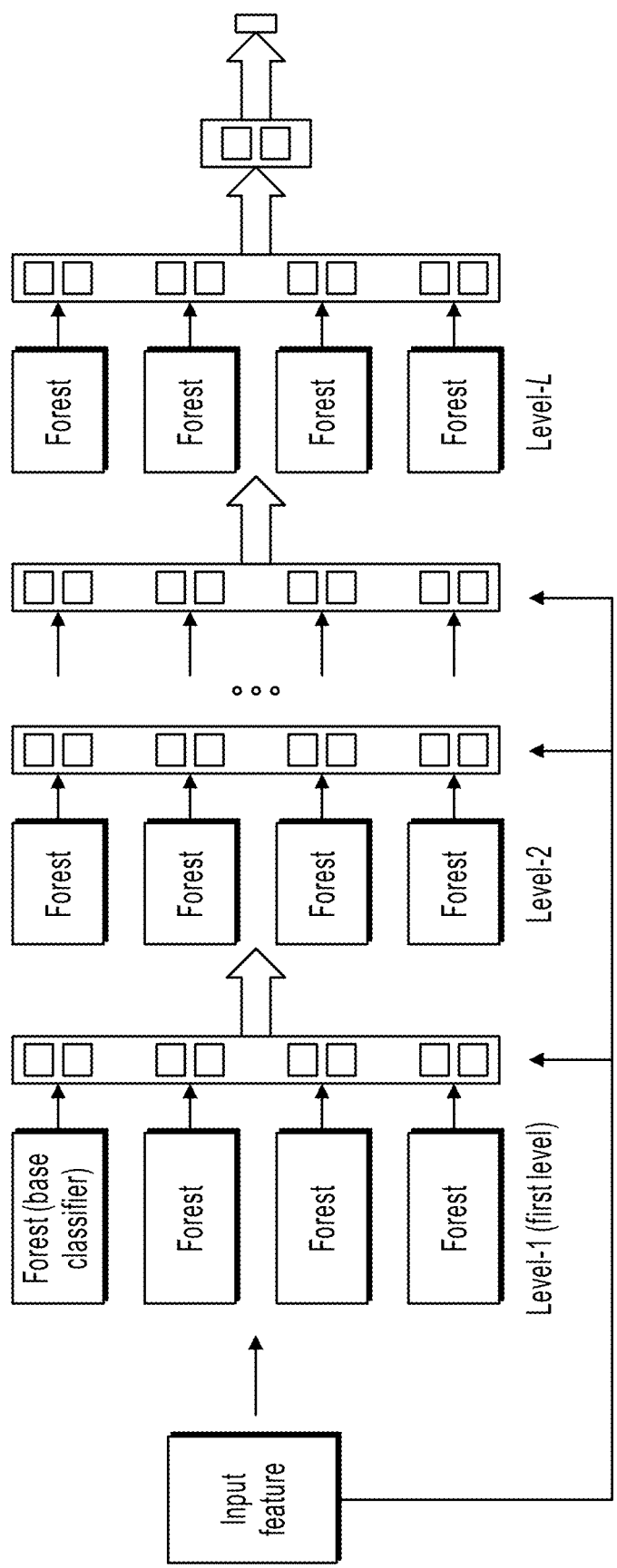
FIG. 2 is a schematic diagram illustrating a deep forest network in a method for training a deep forest network for risky transaction identification, according to a first aspect of implementations of the present specification.

FIG. 2 is a schematic diagram illustrating a deep forest network. The deep forest network includes L levels (L layers), and each level is one set of decision tree forests (decision tree forest set), namely, an ensemble of ensembles (ensemble of ensembles). Each level of decision tree forest set includes multiple base classifiers (forests). Each level of decision tree forest set can include different classifications of forests (such as a random forest and a complete-random tree forest), to improve network diversity. For example, in FIG.

Figure 3:
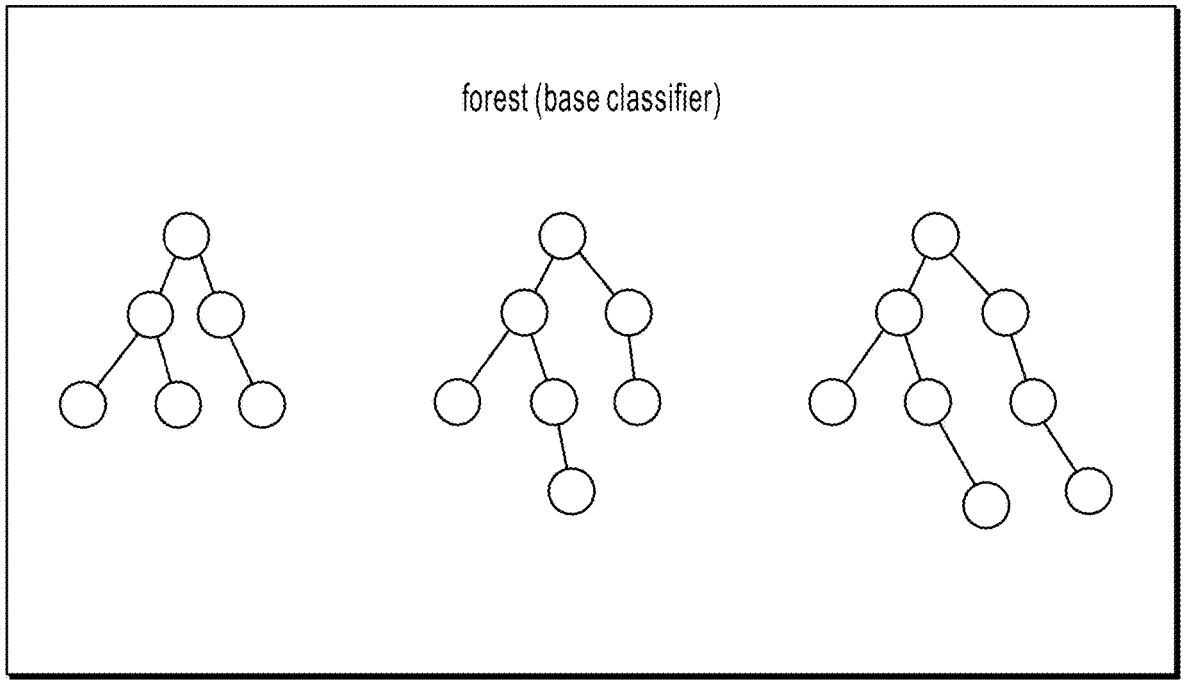
FIG. 3 is an internal schematic diagram illustrating each forest in a method for training a deep forest network for risky transaction identification, according to a first aspect of implementations of the present specification.

2, each level of decision tree forest set includes four base classifiers. Each base classifier includes one or more decision trees. FIG. 3 shows a case in which one base classifier internally includes three decision trees.

In a network training or prediction process, input of each level of decision tree forest set in all levels of cascaded decision tree forest sets, except a last-level decision tree forest set, is a concatenated feature obtained by concatenating feature information processed by a previous level with a raw feature (a first-level decision tree forest set has no previous level, and therefore input of the first-level decision tree forest set is only the raw feature).

In FIG. 2, input of level-1 is a raw feature. If a binary classification issue (two classes are to be predicted) occurs, each base classifier in level-1 outputs a two-dimensional class vector (class vector). In this case, four basic classifiers each generate one two-dimensional class vector, to obtain eight-dimensional class vector (4×2). Then, at level-2, the eight-dimensional class vector is concatenated with a row feature vector, and (n×c+d) augmented features (augmented feature) are received, where d is a number of input initial features, n is a number of base classifies, and c is a number of classes. Likewise, similar processing is performed at level-3 to level-(L-1). At the last level (level-L), input is merely output (that is not concatenated with the raw feature) of a previous level, and an eight-dimensional class vector is output. Finally, process such as averaging is performed on the eight-dimensional class vector, to output a two-dimensional class vector of binary classification.

Figure 4:
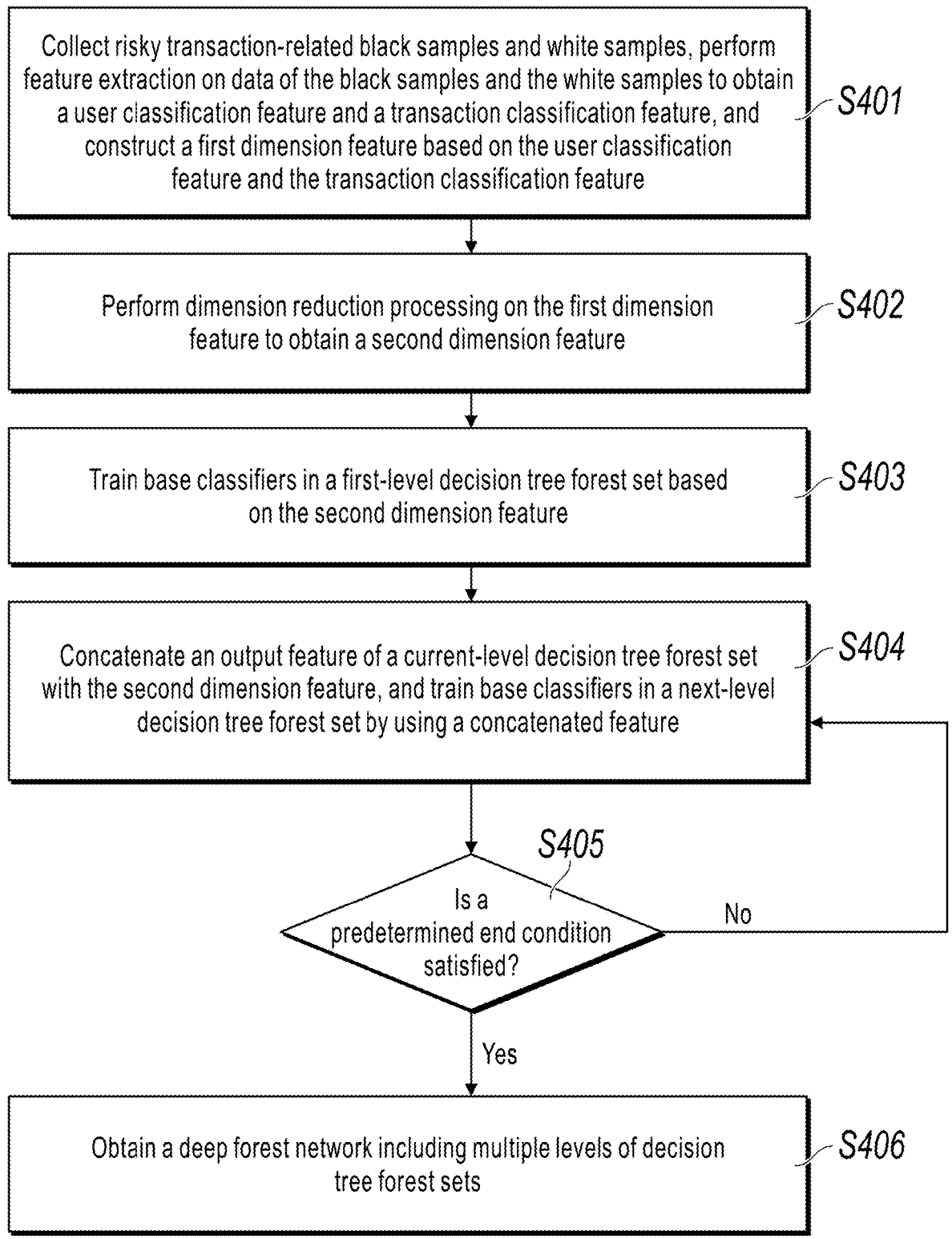
FIG. 4 is a flowchart illustrating a method for training a deep forest network for risky transaction identification, according to a first aspect of implementations of the present specification.

According to a first aspect, an implementation of the present specification provides a flowchart illustrating a method for training a deep forest network for risky transaction identification. Referring to FIG. 4, the method includes steps S401 to S406.

S401. Collect risky transaction-related black samples and white samples, perform feature extraction on data of the black samples and the white samples to obtain a user classification feature and a transaction classification feature, and construct a first dimension feature based on the user classification feature and the transaction classification feature.

Transaction black samples and white samples are separately collected from historical transactions. The black sample is a sample of a risky transaction, and the white sample is a sample of a normal transaction. In an actual scenario, a number of risky transactions is far less than a number of normal transactions, and therefore accuracy of a trained network is usually low due to lack of black samples. In view of this, this implementation of the present invention makes improvements by using multiple methods (feature sampling, sample sampling, decision tree depth limitation, etc.), which is subsequently described.

After the black samples and the white samples are obtained, feature extraction is performed on the black samples and the white samples to obtain multiple classifications of features, such as the user classification feature (such as gender, age, and a number of historical transactions), and the transaction classification feature (such as a trading volume, a transaction limit, and a frequency). All the features are represented by using a vector, to obtain the first dimension feature. Generally, the first dimension feature has a huge number of dimensions, for example, is a feature vector with several hundred dimensions. Network training efficiency is inevitably reduced if the first dimension feature is directly input into a deep forest network for training. In addition, in consideration of a fitting effect, dimension reduction processing is performed on the first dimension feature in S402 in this implementation of the present invention.

S402. Perform dimension reduction processing on the first dimension feature to obtain a second dimension feature.

For ease of description, the following represents "second dimension feature" as "d-dimension feature".

As previously described with reference to FIG. 2, input of an ith level (i is less than a maximum level number L) is a (d+n*c)-dimension feature. In an illegal transaction scenario, a binary classification issue (c=2) usually occurs. When d is large, a value of n*c is insignificant in comparison with d. In this case, less information is provided by the feature, and therefore a fitting effect of subsequent layers is relatively poor. Therefore, to improve a fitting effect, when d is far greater than n*c, dimension reduction processing can be performed on the initially obtained first dimension feature.

In an optional method, a specific method for performing dimension reduction processing on the first dimension feature is: determining a feature sampling frequency based on a feature classification, and performing sampling for the first dimension feature based on the feature sampling frequency to obtain the second dimension feature.

The sampling frequency is determined based on the feature classification because in an illegal transaction, one sample includes different classifications of features, and different features differ in sample density. Therefore, different sampling methods are used for different classifications of features. For example, for the user classification feature (such as gender, age, and a number of historical transactions), the feature is usually sparse, and therefore a relatively low sampling frequency can be used. It can alleviate overfitting, and also can alleviate a case in which fitting is more difficult due to too many missing values during training. For the transaction classification feature (such as a trading volume, a transaction limit, and a frequency), the feature presents gamma distribution, and is a feature of continuous values with relatively few missing values. Therefore, a relatively high sampling frequency can be used, to retain feature attributes as more as possible.

S403. Train base classifiers in a first-level decision tree forest set based on the second dimension feature.

S404. Concatenate an output feature of a current-level decision tree forest set with the second dimension feature, and train base classifiers in a next-level decision tree forest set by using a concatenated feature.

S405. Determine whether a predetermined end condition is satisfied; and return to and repeatedly perform step S404 if the end condition is not satisfied, or perform step S406 if the end condition is satisfied.

The end condition can include multiple conditions. For example, it is determined that the end condition is satisfied when a prediction result is not improved in terms of an evaluation indicator, or when a maximum network layer number (level number L) is reached.

S406. End training when the predetermined end condition is satisfied, to obtain a deep forest network including multiple levels of decision tree forest sets.

A process of training base classifiers in each level of decision tree forest set to obtain the deep forest network is described in the previously described steps S403 to S406. For details, references can be made to FIG. 2 and related descriptions. For example, with reference to FIG. 2, input of level-1 is a raw feature. If a binary classification issue (two classes are to be predicted) occurs, each base classifier in level-1 outputs a two-dimensional class vector. In this case, four basic classifiers each generate one two-dimensional class vector, to obtain eight-dimensional class vector (4×2). Then, at level-2, the eight-dimensional class vector is concatenated with a row feature vector, and (n×c+d) augmented features are received, where d is a number of input initial features, n is a number of base classifies, and c is a number of classes. Likewise, similar processing is performed at level-3 to level-(L-1). At the last level (level-L), input is merely output (that is not concatenated with the raw feature) of a previous level, and an eight-dimensional class vector is output. Finally, processing such as averaging is performed on the eight-dimensional class vector, to output a two-dimensional class vector of binary classification.

As previously described, in an actual scenario, a number of risky transactions is far less than a number of normal transactions, and therefore accuracy of a trained network is usually low due to shortage of black samples. In view of this, in consideration of a case in which a number of black samples is far less than a number of white samples, under a condition that an illegal transaction and a normal transaction can be distinguished from each other through simple division (because a behavior mode of the illegal transaction should be far different from normal behavior), a maximum decision tree depth can be limited to alleviate, to some extent, the problem that training is inaccurate due to few black samples.

Therefore, in an optional method, a maximum decision tree depth threshold can be determined based on a black-to-white sample ratio, and a decision tree depth of the base classifier can be set to be not greater than the maximum depth threshold. For example, a tree depth of each base classifier is not greater than 5 because an illegal transaction and a normal transaction can be distinguished from each other through simple division. Therefore, if a tree depth is too large, it is likely to erroneously identify a sample of a normal transaction because modes of normal samples are not completely consistent.

For example, for the d-dimension feature, a c-classification issue occurs. It is assumed that there are n base classifiers (references can be made to FIG. 2 in which each level of decision tree forest set includes four base classifiers), and each base classifier includes one or more decision trees.

For a problem that a number of black samples and a number of white samples are not equal (there are few black samples), input samples can be divided through k-fold cross validation before base classifiers in each level of decision tree forest set are trained, to alleviate over-fitting.

Cross validation means that raw data (dataset) is divided, where one part of the raw data is used as a train set (train set), and the other part of the raw data is used as a validation set (validation set or test set); and a classifier is first trained by using the train set, and then a trained model (model) is tested by using the validation set, which is used as a performance indicator to evaluate the classifier.

In an optional method, the following preprocessing is performed on the black samples and the white samples: dividing data of the black samples and the white samples into a predetermined number of groups; randomly selecting one group as a validation set, and using a data set of a remaining group as a train set; and separately training base classifiers in each level of decision tree forest set by using each train set in a process of training each level of decision tree forest set. Respective sample sampling frequencies of the black samples and the white samples are determined based on a black-to-white sample ratio, and sampling is separately performed for the black samples and the white samples based on the respective sample sampling frequencies of the black samples and the white samples, to ensure that a number of black samples and a number of white samples in each group are equal or approximately equal.

For example, if there are 100 black samples and 500 white samples, and a black sample sampling frequency is set to ½ and a white sample sampling frequency is ¹/₁₀ based on a black-to-white sample ratio, 50 black samples and 50 white samples are sampled. A total of 100 selected black and white samples is randomly divided into three groups: group 1, group 2, and group 3. In this case, the following three combination modes are obtained: Group 1 is a validation set, and data sets of group 2 and group 3 are train sets; group 2 is a validation set, and data sets of group 1 and group 3 are train sets; and group 3 is a validation set, and data sets of group 1 and group 2 are train sets. In a process of training a base classifier, the base classifier needs to be separately trained by using the previously described three train sets.

Such processing is performed because samples of an illegal transaction may be particularly sparse, and a deviation may be caused due to few black samples in a certain fold. Therefore, sampling can be separately performed for the black samples and the white samples, to ensure that a number of positive samples and a number of negative samples in each fold are consistent or approximately consistent.

Figure 5:
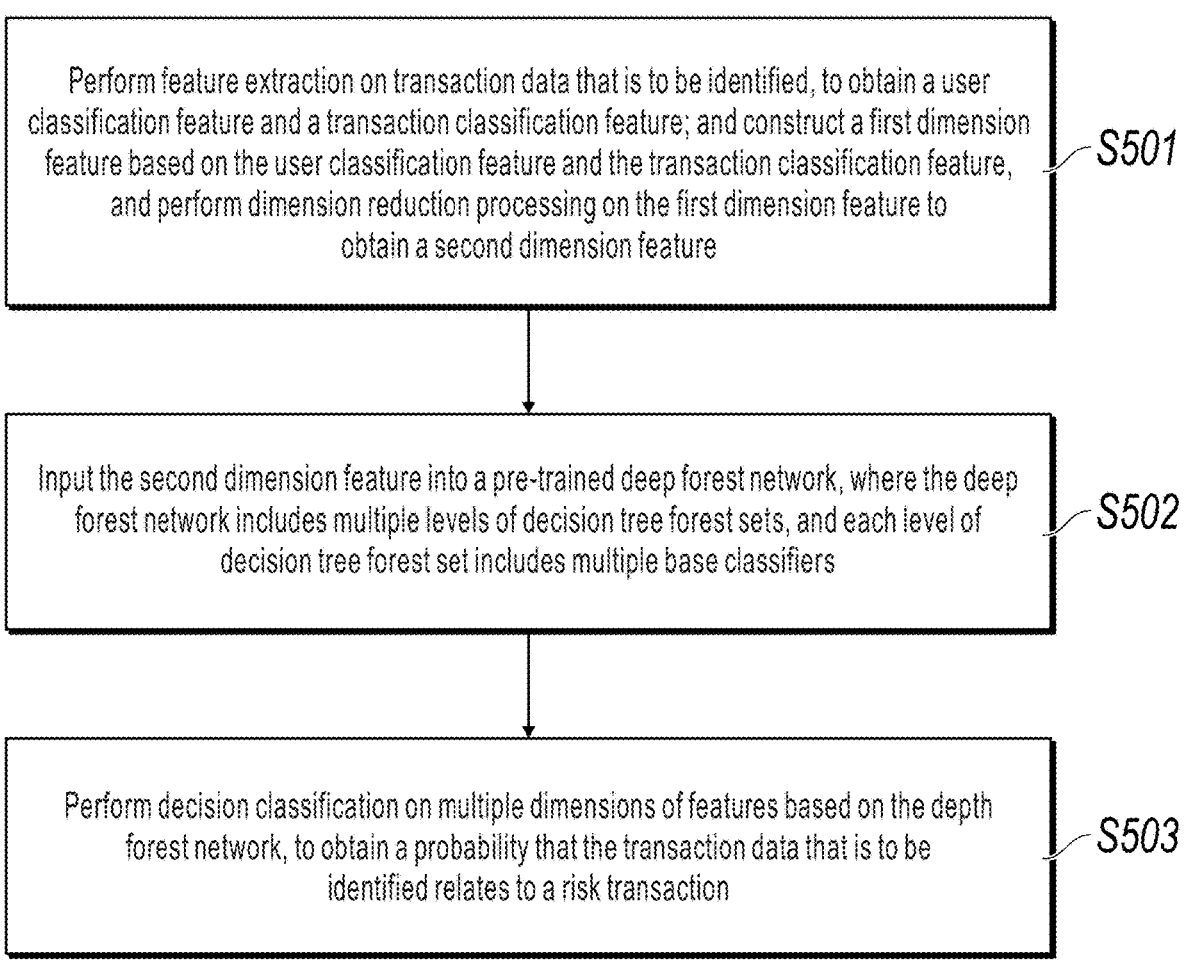
FIG. 5 is a flowchart illustrating a risky transaction identification method, according to a second aspect of implementations of the present specification.

According to a second aspect, an implementation of the present specification provides a risky transaction identification method. Referring to FIG. 5, the method includes the following steps:

S501. Perform feature extraction on transaction data that is to be identified, to obtain a user classification feature and a transaction classification feature; and construct a first dimension feature based on the user classification feature and the transaction classification feature, and perform dimension reduction processing on the first dimension feature to obtain a second dimension feature.

S502. Input the second dimension feature into a pre-trained deep forest network, where the deep forest network includes multiple levels of decision tree forest sets, and each level of decision tree forest set includes multiple base classifiers.

S503. Perform decision classification on multiple dimensions of features based on the depth forest network, to obtain a probability that the transaction data that is to be identified relates to a risky transaction.

For the feature dimension reduction processing and a deep forest network training process, references can be made to the previously described content in the implementations of the present invention.

If the deep forest network has L layers (in other words, includes L levels of decision tree forest sets), the following process is performed when the transaction data that is to be identified is predicted by using the depth forest network:

(1) The transaction data that is to be identified is predicted by using n classifiers: For the transaction data that is to be identified, n*c prediction results are obtained, and the n*c prediction results are concatenated with a raw d-dimension feature to obtain a new (d+n*c)-dimension feature.

(2) For n*c prediction results of the last L layer, the n*c prediction results are averaged based on n classification results to obtain final c prediction results, and the c prediction results are final prediction probabilities of the deep forest network in c classes.

It can be learned that in the risky transaction identification method provided in this implementation of the present invention, dimension reduction processing is performed on features of transaction data, and decision classification is performed on dimension-reduced features by using multiple base classifiers in each level of decision tree forest set in a depth forest network, to finally determine a risky transaction probability. Particularly, a sampling frequency can be determined based on a feature classification, and different sampling methods are used for different classifications of features, so that over-fitting can be alleviated or feature attributes can be retained as more as possible. In addition, for a case in which samples of an illegal transaction may be particularly sparse, sampling can be separately performed for black samples and white samples, and a k-fold cross validation method can be used, to ensure that a number of positive samples and a number of negative samples in each fold are consistent or approximately consistent. Further, a decision tree depth of the base classifier can be set to be not greater than a maximum depth threshold, to alleviate a problem that a sample of a normal transaction is erroneously identified because a number of black samples and a number of white samples are greatly different.

Figure 6:
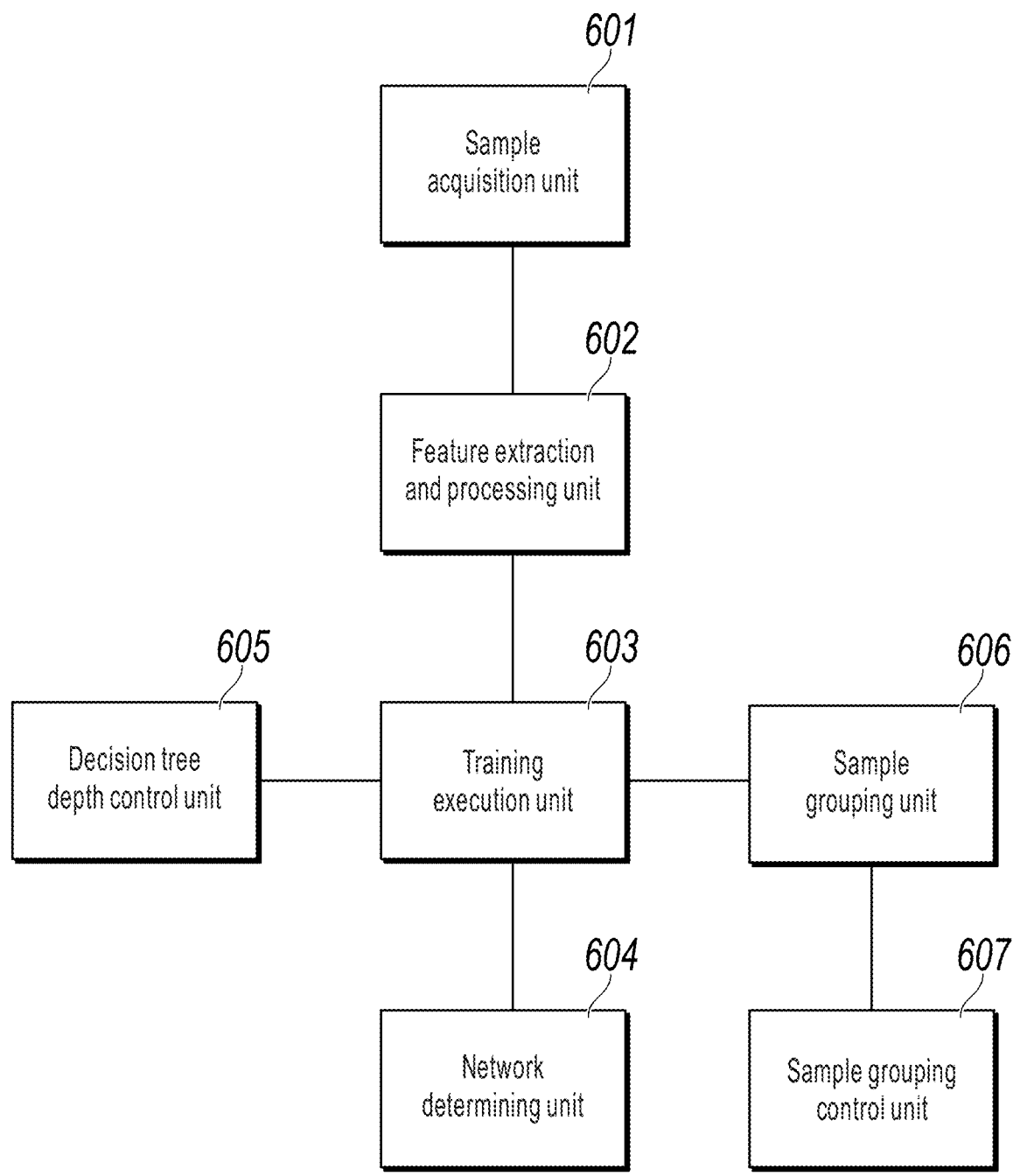
FIG. 6 is a schematic structural diagram illustrating an apparatus for training a deep forest network for risky transaction identification, according to a third aspect of implementations of the present specification.

According to a third aspect, based on the same inventive concept, an implementation of the present specification provides an apparatus for training a deep forest network for risky transaction identification. Referring to FIG. 6, the apparatus includes: a sample acquisition unit 601, configured to collect risky transaction-related black samples and white samples; a feature extraction and processing unit 602, configured to perform feature extraction on data of the black samples and the white samples to obtain a user classification feature and a transaction classification feature; and construct a first dimension feature based on the user classification feature and the transaction classification feature, and perform dimension reduction processing on the first dimension feature to obtain a second dimension feature; a training execution unit 603, configured to train base classifiers in a first-level decision tree forest set based on the second dimension feature, concatenate an output feature of a current-level decision tree forest set with the second dimension feature, and train base classifiers in a next-level decision tree forest set by using a concatenated feature, where whether a predetermined end condition is satisfied is determined after each level of decision tree forest set is trained, and a next-level decision tree forest set is trained only if the predetermined end condition is not satisfied; and a network determining unit 604, configured to end training when the predetermined end condition is satisfied, to obtain the deep forest network including multiple levels of decision tree forest sets.

In an optional method, the feature extraction and processing unit 602 is specifically configured to determine a feature sampling frequency based on a feature classification, and perform sampling for the first dimension feature based on the feature sampling frequency to obtain the second dimension feature.

In an optional method, the base classifier includes one or more decision trees, and the apparatus further includes: a decision tree depth control unit 605, configured to determine a maximum decision tree depth threshold based on a black-to-white sample ratio, and set a decision tree depth of the base classifier to be not greater than the maximum depth threshold.

In an optional method, the apparatus further includes: a sample grouping unit 606, configured to divide the data of the black samples and the white samples into a predetermined number of groups; and randomly select one group as a validation set, and use a data set of a remaining group as a train set.

The training execution unit 603 separately trains base classifiers in each level of decision tree forest set by using each train set, in a process of training each level of decision tree forest set.

In an optional method, the apparatus further includes: a sample grouping control unit 607, configured to determine respective sample sampling frequencies of the black samples and the white samples based on a black-to-white sample ratio; and separately perform sampling for the black samples and the white samples based on the respective sample sampling frequencies of the black samples and the white samples, to ensure that a number of black samples and a number of white samples in each group are equal or approximately equal.

Figure 7:
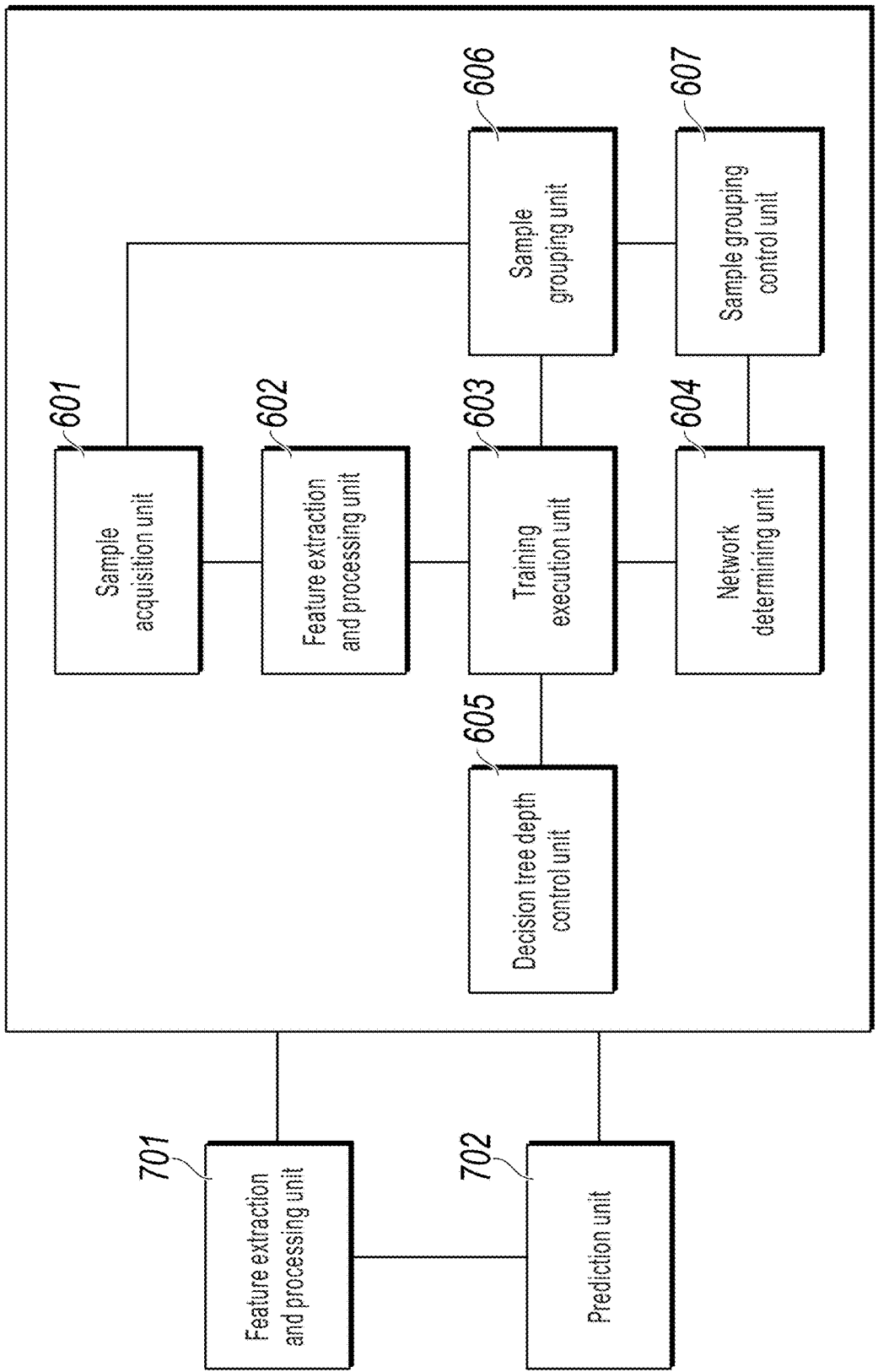
FIG. 7 is a schematic structural diagram illustrating a risky transaction identification apparatus, according to a fourth aspect of implementations of the present specification.

According to a fourth aspect, based on the same inventive concept, an implementation of the present specification provides a risky transaction identification apparatus. Referring to FIG. 7, the apparatus includes: a feature extraction and processing unit 701, configured to perform feature extraction on transaction data that is to be identified, to obtain a user classification feature and a transaction classification feature; and construct a first dimension feature based on the user classification feature and the transaction classification feature, and perform dimension reduction processing on the first dimension feature to obtain a second dimension feature; and a prediction unit 702, configured to input the second dimension feature into a pre-trained deep forest network, where the deep forest network includes multiple levels of decision tree forest sets, and each level of decision tree forest set includes multiple base classifiers; and perform decision classification on multiple dimensions of features based on the depth forest network, to obtain a probability that the transaction data that is to be identified relates to a risky transaction.

In an optional method, the apparatus further includes a network training unit 703.

The network training unit 703 includes: a sample acquisition subunit 7031, configured to collect risky transaction-related black samples and white samples; a feature extraction and processing subunit 7032, configured to perform feature extraction on data of the black samples and the white samples to obtain a first dimension feature, and perform dimension reduction processing on the first dimension feature to obtain a second dimension feature; a training execution subunit 7033, configured to train base classifiers in a first-level decision tree forest set based on the second dimension feature, concatenate an output feature of a current-level decision tree forest set with the second dimension feature, and train base classifiers in a next-level decision tree forest set by using a concatenated feature, where whether a predetermined end condition is satisfied is determined after each level of decision tree forest set is trained, and a next-level decision tree forest set is trained only if the predetermined end condition is not satisfied; and a network determining subunit 7034, configured to end training when the predetermined end condition is satisfied, to obtain the deep forest network including the multiple levels of decision tree forest sets.

In an optional method, the feature extraction and processing unit 701 or the feature extraction and processing subunit 7032 is specifically configured to determine a feature sampling frequency based on a feature classification, and perform sampling for the first dimension feature based on the feature sampling frequency to obtain the second dimension feature.

In an optional method, the base classifier includes one or more decision trees, and the network training unit 703 further includes: a decision tree depth control subunit 7035, configured to determine a maximum decision tree depth threshold based on a black-to-white sample ratio, and set a decision tree depth of the base classifier to be not greater than the maximum depth threshold.

In an optional method, the network training unit 703 further includes: a sample grouping subunit 7036, configured to divide the data of the black samples and the white samples into a predetermined number of groups; and randomly select one group as a validation set, and use a data set of a remaining group as a train set.

The training execution subunit 7033 separately trains base classifiers in each level of decision tree forest set by using each train set in a process of training each level of decision tree forest set.

In an optional method, the network training unit 703 further includes: a sample grouping control subunit 7037, configured to determine respective sample sampling frequencies of the black samples and the white samples based on a black-to-white sample ratio; and separately perform sampling for the black samples and the white samples based on the respective sample sampling frequencies of the black samples and the white samples, to ensure that a number of black samples and a number of white samples in each group are equal or approximately equal.

Figure 8:
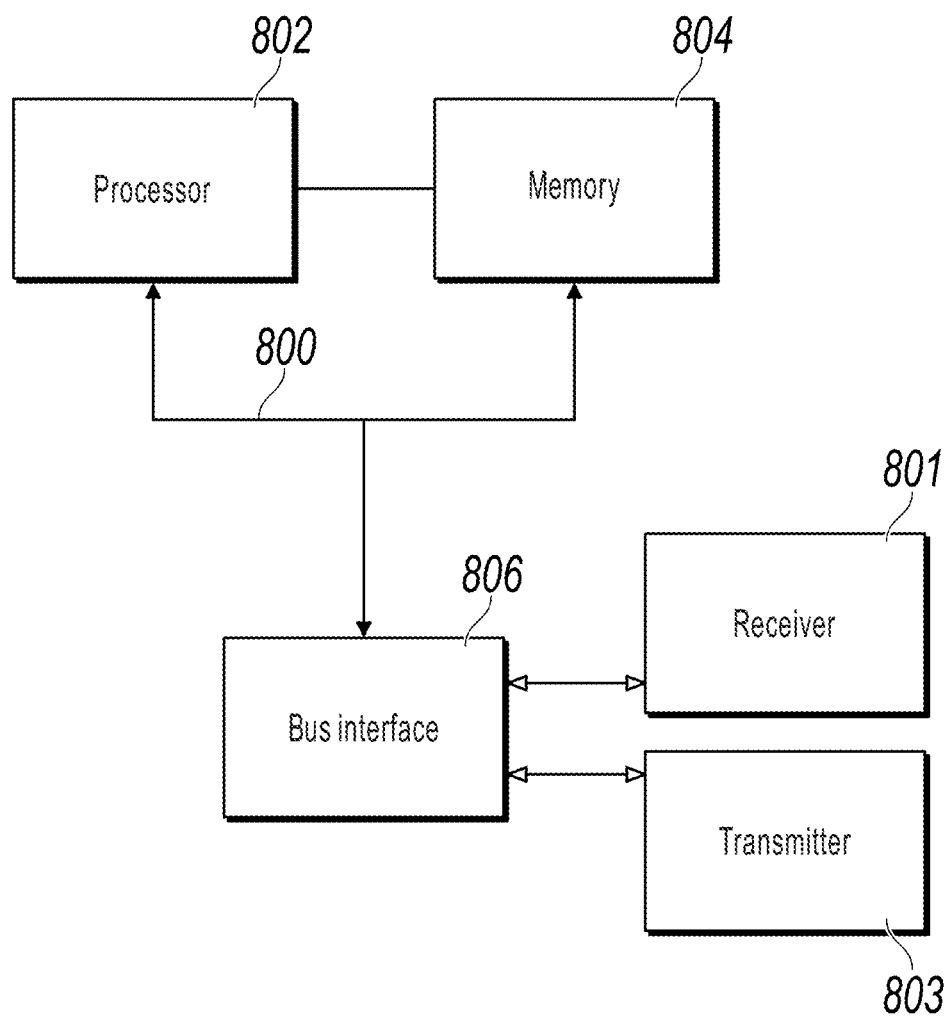
FIG. 8 is a schematic structural diagram illustrating a server, according to a fifth aspect of implementations of the present specification.

According to a fifth aspect, based on the same inventive concept as the risky transaction identification method or the method for training the depth forest network for risky transaction identification in the previously described implementations, the present invention further provides a server. As shown in FIG. 8, the server includes a memory 804, a processor 802, and a computer program that is stored in the memory 804 and that can run on the processor 802. When executing the program, the processor 802 implements the steps of the previously described risky transaction identification methods or the previously described methods for training the depth forest network for risky transaction identification.

In FIG. 8, a bus architecture is represented by a bus 800. The bus 800 can include any number of interconnected buses and bridges, and the bus 800 links together various circuits including one or more processors represented by the processor 802 and a memory represented by the memory 804. The bus 800 can further link together various other circuits such as a peripheral device, a voltage stabilizer, and a power management circuit. These circuits are all well known in the art, and therefore are not further described in the present specification. A bus interface 806 provides an interface between the bus 800 and a receiver 801 and a transmitter 803. The receiver 801 and the transmitter 803 can be one element, namely, a transceiver, providing units configured to communicate with various other apparatuses on a transmission medium. The processor 802 is responsible for managing the bus 800 and general processing, and the memory 804 can be configured to store data used when the processor 802 performs an operation.

According to a sixth aspect, based on the same inventive concept as the risky transaction identification method or the method for training the depth forest network for risky transaction identification in the previously described implementations, the present invention further provides a computer readable storage medium. A computer program is stored in the computer readable storage medium, and the steps of the previously described risky transaction identification method or the previously described method for training the depth forest network for risky transaction identification are implemented when the program is executed by a processor.

The present disclosure is described with reference to the flowcharts and/or block diagrams of the method, the device (system), and the computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specified function in one or more processes in the flowcharts and/or in one or more blocks in the block diagrams.

These computer program instructions can alternatively be stored in a computer readable memory that can instruct a computer or another programmable data processing device to work in a specific way, so that the instructions stored in the computer readable memory generate an artifact that includes an instruction device. The instruction device implements a specified function in one or more processes in the flowcharts and/or in one or more blocks in the block diagrams.

These computer program instructions can alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although example implementations of the present specification have been described, persons skilled in the art can make additional changes and modifications to these implementations once they learn the basic inventive concept. Therefore, the appended claims are intended to be construed as to cover the example implementations and all changes and modifications falling within the scope of the present specification.

Apparently, persons skilled in the art can make various modifications and variations to the present specification without departing from the spirit and scope of the present specification. As such, the present specification is intended to cover these modifications and variations provided that these modifications and variations of the present specification fall within the scope of the claims of the present specification and equivalent technologies thereof.

Figure 9:
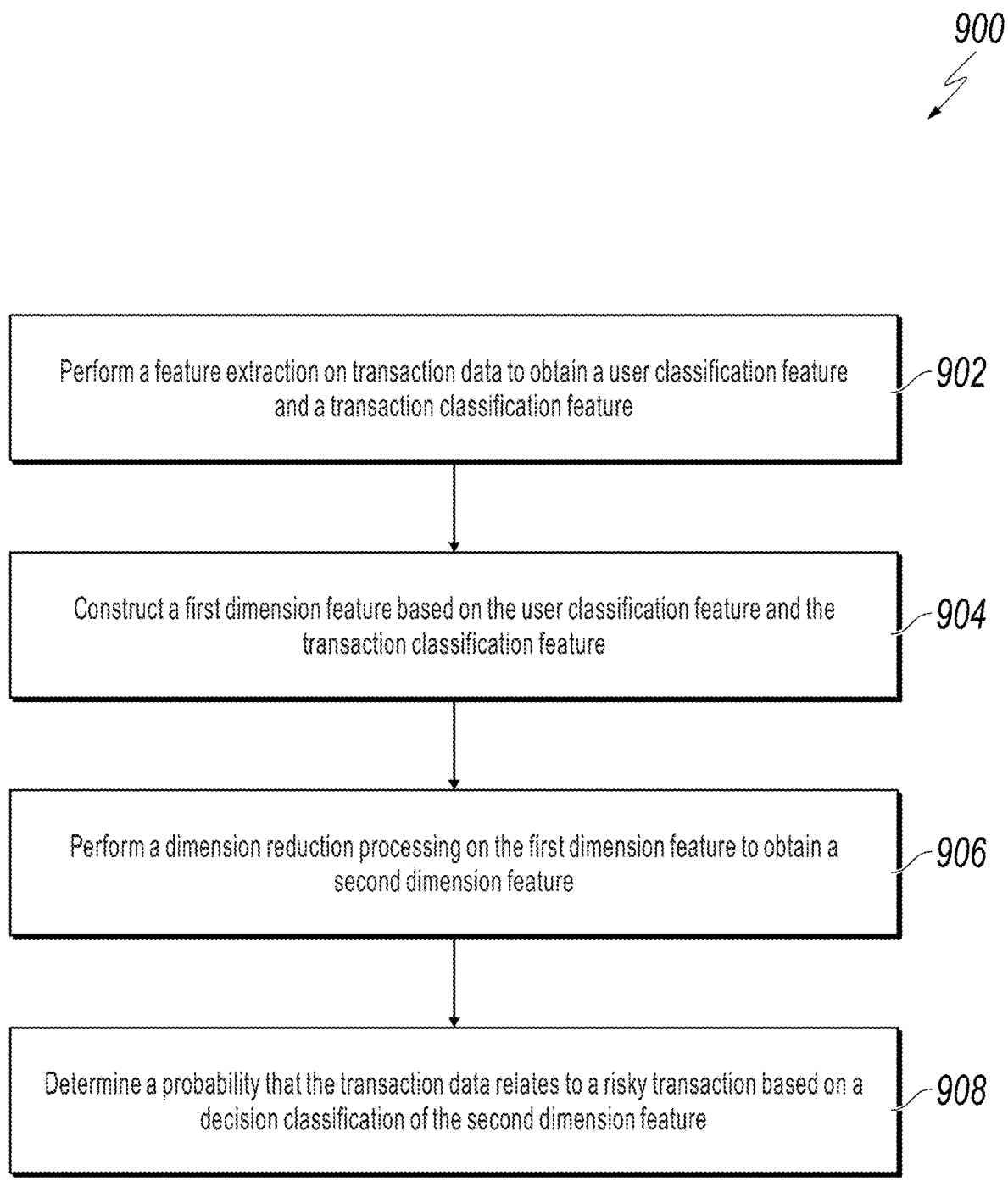
FIG. 9 is a flowchart illustrating an example of a computer-implemented method for identifying a risky transaction using a pre-trained deep forest network, according to an implementation of the present disclosure.

FIG. 9 is a flowchart illustrating an example of a computer-implemented method 900 for identifying a risky transaction based on a pre-trained deep forest network, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a feature extraction is performed on transaction data to obtain a user classification feature and a transaction classification feature. In some implementations, each level of the decision tree forest set includes a plurality of base classifiers. From 902, method 900 proceeds to 904.

At 904, a first dimension feature is constructed based on the user classification feature and the transaction classification feature. From 904, method 900 proceeds to 906.

At 906, a dimension reduction processing is performed on the first dimension feature to obtain a second dimension feature. In some implementations, performing a dimension reduction processing includes determining a feature sampling frequency based on a feature classification; and performing a sampling for the first dimension feature based on the feature sampling frequency to obtain a second dimension feature. From 906, method 900 proceeds to 908.

At 908, a probability that the transaction data relates to a risky transaction is determined based on a decision classification of the second dimension feature, where the decision classification is based on a pre-trained deep forest network including a plurality of levels of decision tree forest sets.

In some implementations, method 900 further including training a deep forest network based on a plurality of transaction samples to obtain a pre-trained deep forest network.

In such implementations, training the deep forest network includes collecting a number of black samples and white samples, where the each black sample relates to a risky transaction, and where each white sample relates to a normal transaction; performing a feature extraction on data associated with the black samples and data associated with the white samples to obtain a first dimension feature; performing a dimension reduction processing on the first dimension feature to obtain a second dimension feature; and iteratively performing a training process on the deep forest network to obtain a pre-trained deep forest network, where the pre-trained deep forest network includes multiple levels of decision tree forest sets.

In such implementations, iteratively performing a training process includes training each base classifier included in a first-level decision tree forest set based on the second dimension feature; concatenating an output feature of a current-level decision tree forest set with the second dimension feature; training each base classifier includes in a next-level decision tree forest set by using a concatenated feature; and terminating the training process if it is determined that a predetermined end condition is satisfied.

In such implementations, where the number of the black samples is not equal to the number of the white samples, method 900 further includes, prior to training each base classifier: dividing data associated with the black samples and data with the white samples through a k-fold cross validation to obtain a train set and a validation set; training a base classifier using the train set to obtain a model; and testing the model using the validation set to obtain a performance indicator that evaluates the base classifier.

In some implementations, method 900 further includes, determining a maximum decision tree depth threshold based on a black-to-white sample ratio; and setting a maximum value of the decision tree depth to the maximum depth threshold. After 908, method 900 stops.

Implementations of the present application can solve technical problems in pre-constructed prediction-algorithm-based attribute data processing. Traditionally, in a risk control scenario where a transaction with a security risk (also referred as "illegal transaction") needs to be identified, the number of such transactions is far less than the number of normal transactions. Further, a ratio of the number of such transactions to the number of normal transactions is usually one to several hundred or several thousands. In addition, it abnormal transactions differ from each other in various aspects. Therefore, it is relatively difficult to dig for an illegal transaction. What is needed is a technique to bypass these problems in the conventional methods, and providing a method for training a deep forest network for risky transaction identification and a risky transaction identification method, applied to the intelligent risk control field, so that more illegal transactions can be identified than previous algorithms through feature dimension reduction, sample sampling, decision tree depth limitation, etc.

Implementation of the present application provide methods and apparatuses for improving the identification of risky transactions by using a pre-trained deep forest network. According to these implementations, dimension reduction processing is performed on features of transaction data, and decision classification is performed on dimension-reduced features by using multiple base classifiers in each level of decision tree forest set in a depth forest network, to finally determine a risky transaction probability. Particularly, a sampling frequency can be determined based on a feature classification, and different sampling methods are used for different classifications of features, so that over-fitting can be alleviated or feature attributes can be retained as more as possible. In addition, for a case in which samples of an illegal transaction may be particularly sparse, sampling can be separately performed for black samples and white samples, and a k-fold cross validation method can be used, to ensure that a number of positive samples and a number of negative samples in each fold are consistent or approximately consistent. Further, a decision tree depth of the base classifier can be set to be lesser or equal to a maximum depth threshold, to alleviate a problem that a sample of a normal transaction is erroneously identified because a number of black samples and a number of white samples are greatly different.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method of identifying a risky transaction, comprising:
    obtaining transaction data describing a transaction initiated by a user of a transaction service;
    extracting, from the obtained transaction data, feature data having a first dimension, the feature data comprising a plurality of user classification features and a plurality of transaction classification features;
    performing a dimension reduction process on the feature data having the first dimension to obtain sampled feature data having a second dimension, comprising:
        for each of the plurality of user classification features:

determining a respective first feature sampling frequency; and sampling, from the plurality of user classification features and in accordance with the respective first feature sampling frequencies, a plurality of sampled user classification features;

for each of the plurality of transaction classification features:

determining a respective second feature sampling frequency; and sampling, from the plurality of transaction classification features and in accordance with the respective second feature sampling frequencies, a plurality of sampled transaction classification features; and determining a probability that the transaction data relates to a risky transaction based on a decision classification of the sampled feature data, wherein the decision classification is based on a pre-trained deep forest network including a plurality of levels of decision tree forest sets.

2. The computer-implemented method of claim 1, wherein each level of the decision tree forest set includes a plurality of base classifiers.

3. The computer-implemented method of claim 1, further comprising training a deep forest network on training data that includes a plurality of transaction samples to obtain the pre-trained deep forest network.

4. The computer-implemented method of claim 3, wherein training the deep forest network comprises:

collecting a plurality of black samples and white samples, wherein the each black sample relates to a risky transaction, and wherein each white sample relates to a normal transaction;

extracting, from data associated with the black samples and data associated with the white samples, feature data;

performing a dimension reduction process on the feature data to obtain sampled feature data; and iteratively performing a training process on the deep forest network to obtain the pre-trained deep forest network, wherein the pre-trained deep forest network includes multiple levels of decision tree forest sets.

5. The computer-implemented method of claim 4, wherein iteratively performing a training process comprises:

training each base classifier included in a first-level decision tree forest set on the sampled feature data;

concatenating one or more output features of a current-level decision tree forest set to the features from the sampled feature data;

training each base classifier included in a next-level decision tree forest set by using the concatenated features; and terminating the training process if it is determined that a predetermined end condition is satisfied.

6. The computer-implemented method of claim 5, wherein a number of the black samples is not equal to a number of the white samples, and the method further comprises:

prior to training each base classifier:

dividing data associated with the black samples and data with the white samples through a k-fold cross validation into one or more training datasets and one or more corresponding validation datasets;

training a base classifier on the training datasets; and testing the base classifier on the validation datasets to obtain a indicator that evaluates a performance of the base classifier.

7. The computer-implemented method of claim 4, further comprising:

determining a maximum decision tree depth threshold based on a black-to-white sample ratio; and setting a maximum value of the decision tree depth to the maximum depth threshold.

8. A non-transitory, computer-readable medium storing one or more instructions executable by a computer system to perform operations to identify a risky transaction comprising:

obtaining transaction data describing a transaction initiated by a user of a transaction service;

extracting, from the obtained transaction data, feature data having a first dimension, the feature data comprising a plurality of user classification features and a plurality of transaction classification features;

performing a dimension reduction process on the feature data having the first dimension to obtain a sampled feature data having a second dimension, comprising:

for each of the plurality of user classification features:

determining a respective first feature sampling frequency; and sampling, from the plurality of user classification features and in accordance with the respective first feature sampling frequencies, a plurality of sampled user classification features;

for each of the plurality of transaction classification features:

determining a respective second feature sampling frequency; and sampling, from the plurality of transaction classification features and in accordance with the respective second feature sampling frequencies, a plurality of sampled transaction classification features; and determining a probability that the transaction data relates to a risky transaction based on a decision classification of the sampled feature data, wherein the decision classification is based on a pre-trained deep forest network including a plurality of levels of decision tree forest sets.

9. The non-transitory, computer-readable medium of claim 8, wherein each level of the decision tree forest set includes a plurality of base classifiers.

10. The non-transitory, computer-readable medium of claim 8, the operations further comprising training a deep forest network on training data that includes a plurality of transaction samples to obtain the pre-trained deep forest network.

11. The non-transitory, computer-readable medium of claim 10, wherein training the deep forest network comprises:

collecting a plurality of black samples and white samples, wherein the each black sample relates to a risky transaction, and wherein each white sample relates to a normal transaction;

extracting, from data associated with the black samples and data associated with the white samples, feature data;

performing a dimension reduction process on the feature data to obtain sampled feature data; and iteratively performing a training process on the deep forest network to obtain the pre-trained deep forest network, wherein the pre-trained deep forest network includes multiple levels of decision tree forest sets.

12. The non-transitory, computer-readable medium of claim 11, wherein iteratively performing a training process comprises:

training each base classifier included in a first-level decision tree forest set on the sampled feature data;
concatenating one or more output features of a current-level decision tree forest set to the features from the sampled feature data;
training each base classifier included in a next-level decision tree forest set by using the concatenated features; and
terminating the training process if it is determined that a predetermined end condition is satisfied.

13. The non-transitory, computer-readable medium of claim 11, wherein a number of the black samples is not equal to a number of the white samples, and the operations further comprise:
prior to training each base classifier:
dividing data associated with the black samples and data with the white samples through a k-fold cross validation into one or more training datasets and one or more corresponding validation datasets;
training a base classifier on the training datasets; and
testing the base classifier on the validation datasets to obtain a indicator that evaluates a performance of the base classifier.

14. The non-transitory, computer-readable medium of claim 11, the operations further comprising:
determining a maximum decision tree depth threshold based on a black-to-white sample ratio; and
setting a maximum value of the decision tree depth to the maximum depth threshold.

15. A computer-implemented system of identifying a risky transaction, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining transaction data describing a transaction initiated by a user of a transaction service;
extracting, from the obtained transaction data, feature data having a first dimension, the feature data comprising a plurality of user classification features and a plurality of transaction classification features;
performing a dimension reduction process on the feature data having the first dimension to obtain sampled feature data having a second dimension, comprising:
for each of the plurality of user classification features:
determining a respective first feature sampling frequency; and
sampling, from the plurality of user classification features and in accordance with the respective first feature sampling frequencies, a plurality of sampled user classification features;
for each of the plurality of transaction classification features:
determining a respective second feature sampling frequency; and
sampling, from the plurality of transaction classification features and in accordance with the respective second feature sampling frequencies, a plurality of sampled transaction classification features; and
determining a probability that the transaction data relates to a risky transaction based on a decision classification of the sampled feature data, wherein the decision classification is based on a pre-trained deep forest network including a plurality of levels of decision tree forest sets.

16. The computer-implemented system of claim 15, the operations further comprising training a deep forest network on training data that includes a plurality of transaction samples to obtain the pre-trained deep forest network.

17. The computer-implemented system of claim 16, wherein training the deep forest network comprises:
collecting a plurality of black samples and white samples, wherein the each black sample relates to a risky transaction, and wherein each white sample relates to a normal transaction;
extracting, from data associated with the black samples and data associated with the white samples, feature data;
performing a dimension reduction process on the feature data to obtain sampled feature data; and
iteratively performing a training process on the deep forest network to obtain the pre-trained deep forest network, wherein the pre-trained deep forest network includes multiple levels of decision tree forest sets.

* * * * *